(12) United States Patent
Krieg et al.

(10) Patent No.: US 11,349,326 B2
(45) Date of Patent: May 31, 2022

(54) ELECTRICAL ENERGY STORAGE SYSTEM AND METHOD FOR OPERATING SAME

(71) Applicant: Robert Bosch GmbH, Stuttgart (DE)

(72) Inventors: Berengar Krieg, Gerlingen (DE); Christoph Fischer, Stuttgart (DE); Frank Stimm, Leonberg (DE); Regine Mantel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/893,370

(22) Filed: Jun. 4, 2020

(65) Prior Publication Data

US 2020/0389042 A1    Dec. 10, 2020

(30) Foreign Application Priority Data

Jun. 6, 2019    (DE) ..................... 10 2019 208 280.7

(51) Int. Cl.
| | |
|---|---|
| *H02J 7/00* | (2006.01) |
| *H01M 50/502* | (2021.01) |
| *H01M 10/0525* | (2010.01) |

(52) U.S. Cl.
CPC ..... *H02J 7/007182* (2020.01); *H01M 50/502* (2021.01); *H01M 10/0525* (2013.01); *H01M 2220/20* (2013.01); *H02J 2207/20* (2020.01)

(58) Field of Classification Search
None
See application file for complete search history.

(56) References Cited

U.S. PATENT DOCUMENTS

| | | | |
|---|---|---|---|
| 2012/0139338 A1 | 6/2012 | Kim et al. | |
| 2014/0183939 A1* | 7/2014 | Jiang | ........................ B60L 7/10 307/9.1 |
| 2014/0354212 A1* | 12/2014 | Sugeno | ................... B60L 58/12 320/103 |

(Continued)

FOREIGN PATENT DOCUMENTS

| | | |
|---|---|---|
| DE | 102012220549 A1 | 5/2014 |
| DE | 102015206523 | 10/2016 |

(Continued)

*Primary Examiner* — Arun C Williams
(74) *Attorney, Agent, or Firm* — Michael Best & Friedrich LLP

(57) ABSTRACT

Electrical energy storage system comprising a plurality of electrochemical energy stores, which are electrically connectable to primary connection poles of the electrical energy storage system for providing a primary voltage; secondary connection poles for providing a secondary voltage, wherein the secondary connection poles are electrically connectable to an electric power source by means of secondary switches; at least one first primary switch, which is electrically connected to an electrical connection between two of the electrochemical energy stores and to an electrical connection between a first secondary switch and a first secondary connection pole, wherein the electrochemical energy stores electrically connected between the electrical connection and a second primary connection pole are electrically connectable to the first secondary connection pole of the electrical energy storage system by means of the first primary switch to provide a secondary voltage, which is lower than the primary voltage.

8 Claims, 2 Drawing Sheets

(56) References Cited

U.S. PATENT DOCUMENTS

| | | | | |
|---|---|---|---|---|
| 2015/0061569 | A1* | 3/2015 | Alexander | H02J 7/0027 320/101 |
| 2018/0281616 | A1 | 10/2018 | Kim et al. | |
| 2019/0176729 | A1* | 6/2019 | Link | B60L 58/19 |
| 2019/0359078 | A1* | 11/2019 | Yamada | H02J 1/12 |

FOREIGN PATENT DOCUMENTS

| | | |
|---|---|---|
| DE | 102016224618 | 6/2018 |
| DE | 102019000352 A1 | 8/2019 |
| DE | 102018207263 A1 | 11/2019 |
| EP | 3398818 A1 | 11/2018 |
| WO | 2018147542 A1 | 8/2018 |

\* cited by examiner

ELECTRICAL ENERGY STORAGE SYSTEM AND METHOD FOR OPERATING SAME

BACKGROUND OF THE INVENTION

The invention is based on an electrical energy storage system, a method for operating an electrical energy storage system, the use of the electrical energy storage system and a computer program.

In many vehicles with an internal combustion engine, CO2 is saved by using a 48V system to assist the internal combustion engine and for an energy recovery in overrun phases. This 48V system consists of an electrical machine, coupled to a drivetrain of the vehicle, and a battery system having a nominal voltage of 48 V.

In (semi)autonomous vehicles, redundantly powered sensors and actuators are needed in order to ensure ASIL D-compliant functionality. This means that, at least up until the driver takes over or up until the autonomous vehicle is positioned in a safe area, the vehicle needs to be able to be controlled even in the event of failure of the primary systems, in particular steering, brakes, vehicle lighting. This is often accomplished by using a separate DC-DC converter that sets up a redundant 12V supply from the 48V system.

The document DE 10 2016 224 618 discloses a vehicle onboard electrical system, comprising a first subsystem at a first voltage level, a second subsystem at a second voltage level and a number of loads. The first subsystem has at least one first energy store connected to it to supply energy and/or to draw energy. The second subsystem has at least one second energy store connected to it to supply energy and/or to draw energy. Some of the number of loads are couplable to the first and second subsystems and suppliable with energy from the first and/or second subsystem depending on an operating situation. Further, there is provision for a third subsystem at a third voltage level, which is higher than the first and second voltage levels. The third subsystem has a third energy store connected to it, which comprises at least one partial tap to which a voltage corresponding to the first voltage level is applied with reference to a reference-ground potential of the vehicle onboard electrical system. The first subsystem is connected to the partial tap of the third energy store, as a result of which the first energy store of the first subsystem is provided by a store section of the third energy store.

The document DE 10 2015 206 523 discloses a power supply circuit, in particular for motor vehicles, having a main electrical energy store having multiple series-connected storage modules, and a redundancy circuit, connectable in the event of a fault, that taps off a voltage from a single one of the storage modules in order to ensure an emergency power supply. Furthermore, the invention relates to a motor vehicle having such a power supply circuit.

It is an object of the present invention to improve the prior art further.

SUMMARY OF THE INVENTION

The object is achieved according to the invention. To this end, the electrical energy storage system comprises:

a plurality of electrochemical energy stores, which are electrically connectable to primary connection poles of the electrical energy storage system for providing a primary voltage;

secondary connection poles for providing a secondary voltage, wherein the secondary connection poles are electrically connectable to an electric power source by means of secondary switches;

at least one first primary switch, which is electrically connected to an electrical connection between two of the electrochemical energy stores and to an electrical connection between a first secondary switch and a first secondary connection pole, wherein the electrochemical energy stores electrically connected between the electrical connection and a second primary connection pole are electrically connectable to the first secondary connection pole of the electrical energy storage system by means of the first primary switch to provide a secondary voltage, which is lower than the primary voltage.

An electrical energy storage system within the context of the present invention is intended to be understood to mean an energy storage system having energy stores from or to which electric power can be either taken or supplied and taken. The energy store is in the form of a charge store and/or in the form of a magnetic energy store and/or an electrochemical energy store. An electrochemical energy store is in particular a rechargeable battery or a storage battery. Advantageously, the electrochemical energy store is a lithium ion, lithium sulfur, lithium air battery and/or a battery having a solid electrolyte.

The electrical energy storage system further comprises:

at least one second primary switch, which is electrically connected to an electrical connection between the second primary connection pole and an electrical connection between a second secondary switch and a second secondary connection pole, wherein the second primary connection pole is electrically connectable to the second secondary connection pole by means of the second primary switch.

The voltage of each of the electrochemical energy stores is in the range $0.1\ V \leq X \leq 60\ V$, particularly preferably in the range $2.8\ V \leq X \leq 4.2\ V$. Advantageously, a series connection comprising 12 electrochemical energy stores has a nominal voltage of 48 V applied, for example for a 48V system for assisting an internal combustion engine and for energy recovery in overrun phases of a vehicle having the electrical energy storage system.

The method for operating an electrical energy storage system comprises the following steps:

a) capturing a voltage variable that represents a voltage of the electric power source;

b) producing plausibility information on the basis of a comparison of the captured voltage variable with a prescribed voltage range.

The plausibility information represents an implausible voltage if the voltage variable is outside the voltage range.

The method further comprises the following step:

c) initiating measures on the basis of the plausibility information, in particular in the event of an implausible voltage.

The measures comprise opening the secondary switches to disconnect the secondary connection poles and the electric power source; closing the first primary switch, to provide a secondary voltage; and/or closing the second primary switch, to reduce a ground offset between the second primary connection pole and the second secondary connection pole.

Advantageously, the electrical energy storage system according to the invention is used in electrical energy stores for electric vehicles, hybrid vehicles, plug-in hybrid vehicles, aircraft, pedelecs or e-bikes, for portable devices for telecommunications or data processing, for electrical handheld tools or kitchen machines, and in stationary stores for storing in particular regeneratively obtained electric power.

According to an advantageous configuration of the invention, there is provision for a computer program, comprising instructions that cause the electrical energy storage system to carry out the method steps according to the invention.

Further, there is provision for a machine-readable storage medium on which the computer program is stored.

BRIEF DESCRIPTION OF THE DRAWINGS

Exemplary embodiments of the invention are depicted in the drawing and explained in more detail in the description below.

In the drawing.

DETAILED DESCRIPTION

Identical reference signs refer to identical apparatus components in all figures.

Figure 1:
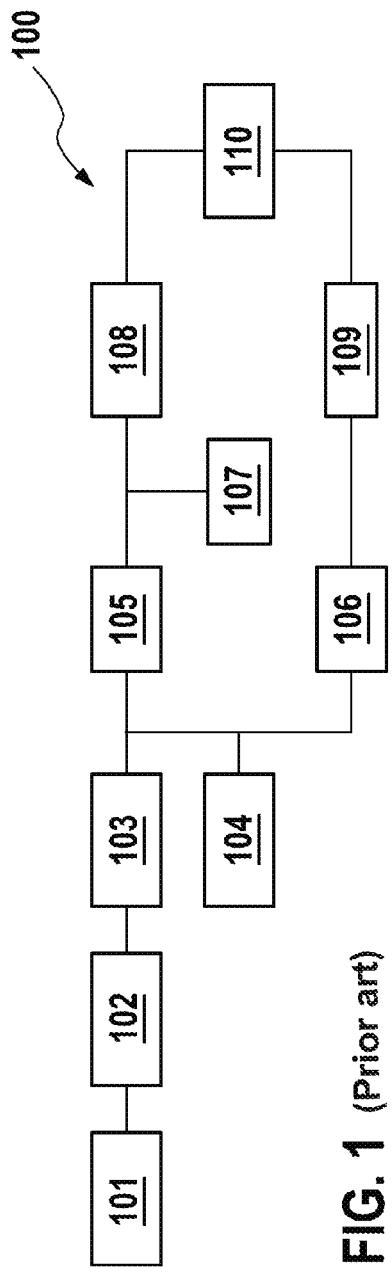
FIG. 1 shows a schematic depiction of a system topology based on the prior art.

FIG. 1 shows a schematic depiction of a system topology 100 based on the prior art. The system topology 100 comprises an internal combustion engine 101, an electrical machine 102, power electronics 103, a 48 volt energy store 104, a DC-DC converter 105, a 12 volt energy store 107 connected to the DC-DC converter 105 and also primary sensors and actuators 108, a redundant DC-DC converter 106 for supplying power to redundant sensors and actuators 109 and also primary systems 110, for example brake system, steering system and/or lighting system.

Figure 2:
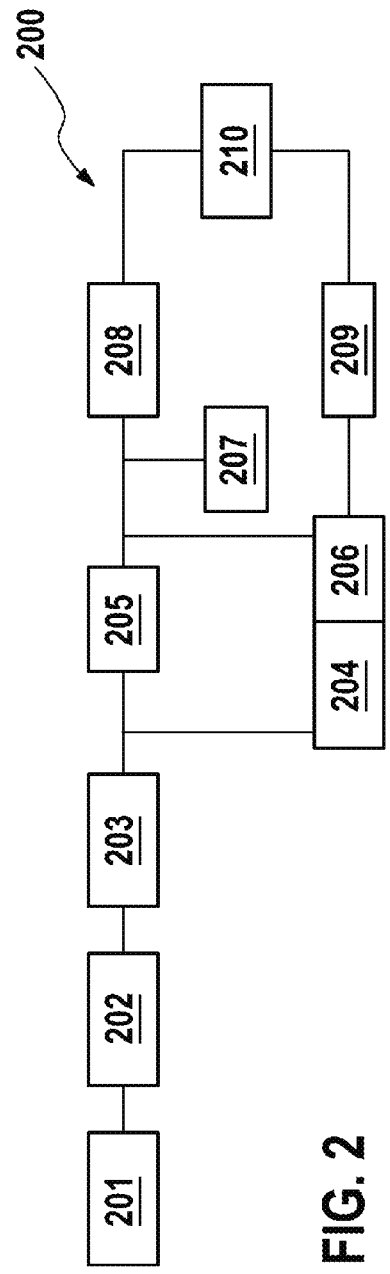
FIG. 2 shows a schematic depiction of an embodiment of a system topology according to the invention.

FIG. 2 shows a schematic depiction of an embodiment of a system topology 200 according to the invention. The system topology 200 comprises an internal combustion engine 201, an electrical machine 202, power electronics 203, a 48 volt energy store 204, a DC-DC converter 205, a 12 volt energy store 207 connected to the DC-DC converter 205 and also primary sensors and actuators 208. A redundant electronic circuit 206 can be used to provide a 12 volt voltage for redundant sensors and actuators 209 and also primary systems 210 at secondary connection poles of the energy store 204.

Figure 3:
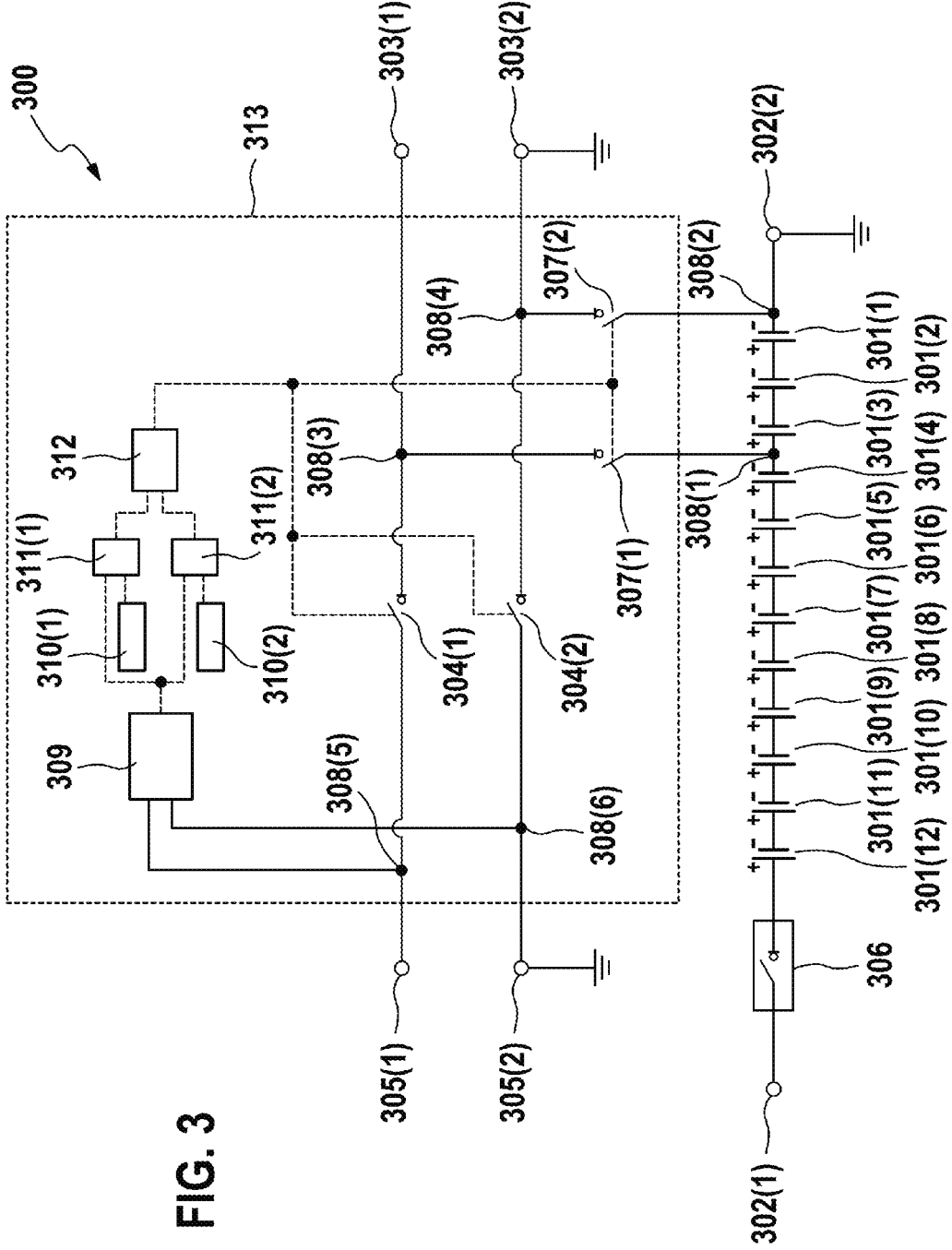
FIG. 3 shows a schematic depiction of an embodiment of an electrochemical energy storage system according to the invention.

FIG. 3 shows a schematic depiction of an embodiment of an electrochemical energy storage system 300 according to the invention. The electrochemical energy storage system 300 comprises a plurality of electrochemical energy stores 301(1), 301(2), . . . 301(12) that are electrically connectable to primary connection poles 302 of the electrochemical energy storage system 300, for example by means of a switch 306 or relay. A second primary connection pole 302(2) is electrically connected to a first ground connection.

In the embodiment shown, the electrochemical energy storage system has a series connection comprising the electrochemical energy stores 301(1), 301(2), . . . 301(12), wherein the number can vary depending on the energy storage system 300. The electrochemical energy stores 301(1), 301(2), . . . 301(12) each have a voltage of between 2.8 volts and 4.2 volts, depending on the state of charge and loading. A series connection comprising 3 energy stores 301 in each case accordingly has a voltage suitable for supplying power to a 12V grid, for example for supplying power to a redundant sensor-actuator combination at secondary connection poles 303.

Three adjacent energy stores 301, for example the energy stores 301(1), 301(2), 301(3) connected up closest to the second primary connection pole 302(2), are used to ensure the supply of power to the redundant sensor-actuator combination. Since the redundant sensor-actuator combination also needs to operate in a normal mode, that is to say not only in the event of the failure of the primary supply, the redundant supply cannot be provided permanently from these three energy stores 301(1), 301(2), 301(3), since there would otherwise be a permanent discharge of these energy stores 301(1), 301(2), 301(3).

The energy stores 301 are recharged via the primary connection poles 302, for example via a 48V grid, however, but only to the extent that the remaining electrically series-connected energy stores 301(1), 301(2), 301(3) are able to receive charge. An imbalance thus arises between voltages of the electrochemical energy stores 301 to an extent for which a state-of-charge equalization circuit of the electrochemical energy storage system 300 is conventionally not designed.

Since a supply of power to the redundant sensor-actuator combination needs to be maintained only in the event of the failure and then only for a limited time independently of the primary supply, a different state of charge between the energy stores 301 can be tolerated.

In a normal mode, the primary supply, for example an electric power source as 12V primary supply, at connection poles 305(1), 305(2) is connected to a redundant grid, for example a redundant 12V grid, using secondary connection poles 303(1), 303(2) of the energy storage system 300. This can be accomplished by using secondary switches 304(1), 304(2) that are closed in the inactive state ("break contacts"), for example.

A monitoring circuit 313, which can be implemented in electronics hardware or else with SW assistance, monitors a voltage of the primary supply. If it is detected that there is a fault in the primary supply, for example as a result of production of plausibility information 312 on the basis of a comparison 311(1), 311(2) of a voltage variable 309 captured between electrical connections 308(5), 308(6), which represents a voltage of the electric power source, with a prescribed voltage range 310, in particular if an upper voltage limit 310(1) is exceeded or a lower voltage limit 310(2) is undershot, then the two secondary switches 304(1), 304(2) electrically connecting the connection poles 305(1), 305(2) of the primary supply and the secondary connection poles 303(1), 303(2) are opened so as not to transmit a fault to the redundant grid.

At the same time, a first primary switch 307(1), which is electrically connected to an electrical connection 308(1) between two of the electrochemical energy stores 301(3), 301(4) and to an electrical connection 308(3) between a first secondary switch 304(1) and a first secondary connection pole 303(1), and which is open in the inactive state ("make contact"), for example, is closed in order to feed the redundant grid from the three energy stores 301(1), 301(2), 301(3) that are directly connected to the second primary connection pole 302(2), for example the 48V negative pole.

The electrical connection 308(1) is arranged between two other electrochemical energy stores 301(1) and 301(12) in further advantageous embodiments if:

the primary supply has an electric power source with a primary supply different than 12 V; and/or the voltage of each of the electrochemical energy stores 301 is outside the particularly preferred range 2.8 V≤X≤4.2 V, for example in the range 0.1 V≤X≤60 V; and/or the electrical energy storage system comprises a different number of electrochemical energy stores 301 than in the embodiment shown.

As such, in an alternative embodiment, the electrical connection 308(1) is arranged between the electrochemical energy stores 301(1) and 301(2) or 301(2) and 301(3), for example, if the voltage of each of the electrochemical energy stores 301 is above the particularly preferred range 2.8 V≤X≤4.2 V.

In a further alternative embodiment, the electrical connection 308(1) is arranged between the electrochemical energy stores 301(4) and 301(5) or 301(5) and 301(6) or 301(11) and 301(12), for example, if the voltage of each of the electrochemical energy stores 301 is below the particularly preferred range 2.8 V≤X≤4.2 V.

Additionally, there can be provision for a second primary switch 307(2), which is electrically connected to an electrical connection 308(2) between the second primary connection pole 302(2) and an electrical connection 308(4) between a second secondary switch 304(2) and a second secondary connection pole 303(2), wherein the second primary connection pole 302(2) is electrically connectable to the second secondary connection pole 303(2) by means of the second primary switch 307(2) in order to minimize a ground offset between the second primary connection pole 302(2) and the potential of the second secondary connection pole 303(2).

In a further advantageous embodiment, it is additionally monitored whether there is a defined system start, for example starting of an internal combustion engine of the vehicle. Only after there is a defined system start is the primary supply changed over to the redundant supply. This prevents changeover to the redundant supply, for example as a result of disconnection of a 12V battery of the vehicle used for the 12V primary supply, in the switched-off mode. Advantageously, the redundant supply is changed over to the primary supply if it is certain that the primary supply is stable again and the redundant supply is no longer needed. A separate ground network for the redundant sensors and actuators can be dispensed with. Advantageously, the supply of power to a battery management system of the energy storage system 300 is also ensured.

The invention claimed is:

1. An electrical energy storage system (300) comprising:
   a plurality of electrochemical energy stores (301), which are electrically connectable to primary connection poles (302) of the electrical energy storage system (300) for providing a primary voltage;
   secondary connection poles (303) for providing a secondary voltage, wherein the secondary connection poles (303) are electrically connectable to third connection poles (305), which supply voltage from an electric power source, by means of secondary switches (304);
   at least one first primary switch (307(1)), which is electrically connected to an electrical connection (308(1)) between two of the electrochemical energy stores (301(1) to 301(12)) and to an electrical connection (308(3)) between a first secondary switch (304(1)) and a first secondary connection pole (303(1)), wherein the electrochemical energy stores (301(1), 301(2), 301(3)) electrically connected between the electrical connection (308(1)) and a second primary connection pole (302(2)) are electrically connectable to the first secondary connection pole (303(1)) of the electrical energy storage system (300) by means of the first primary switch (307(1)) to provide a secondary voltage, which is lower than the primary voltage.

2. The electrical energy storage system (300) according to claim 1, further comprising:
   at least one second primary switch (307(2)), which is electrically connected to an electrical connection (308(2)) between the second primary connection pole (302(2)) and an electrical connection (308(4)) between a second secondary switch (304(2)) and a second secondary connection pole (303(2)), wherein the second primary connection pole (302(2)) is electrically connectable to the second secondary connection pole (303(2)) by means of the second primary switch (307(2)).

3. The electrical energy storage system (300) according to claim 1, wherein the voltage of each of the electrochemical energy stores (301) is in the range 0.1 V≤X≤60 V.

4. A method for operating an electrical energy storage system (300) according to claim 1, comprising the following steps:
   capturing a voltage variable (309) that represents a voltage of the electric power source;
   producing plausibility information (312) on the basis of a comparison (311) of the captured voltage variable (309) with a prescribed voltage range (310).

5. The method according to claim 4, wherein the plausibility information (312) represents an implausible voltage if the voltage variable is outside the voltage range.

6. The method according to claim 5, further comprising the following step:
   initiating measures on the basis of the plausibility information (312).

7. The method according to claim 6, wherein the measures comprise opening the secondary switches (304) to disconnect the secondary connection poles (303) and the electric power source; (i) closing the first primary switch (308(1)), to provide a secondary voltage; (ii) closing the second primary switch (308(2)), to reduce a ground offset between the second primary connection pole (302(2)) and the second secondary connection pole (303(2)); or both (i) and (ii).

8. A non-transitory, computer-readable storage medium containing instructions that when executed by a computer cause the computer to control an electrical energy storage system (300) having
   a plurality of electrochemical energy stores (301), which are electrically connectable to primary connection poles (302) of the electrical energy storage system (300) for providing a primary voltage;
   secondary connection poles (303) for providing a secondary voltage, wherein the secondary connection poles (303) are electrically connectable to third connection poles (305), which supply voltage from an electric power source by means of secondary switches (304);
   at least one first primary switch (307(1)), which is electrically connected to an electrical connection (308(1)) between two of the electrochemical energy stores (301(1) to 301(12)) and to an electrical connection (308(3)) between a first secondary switch (304(1)) and a first secondary connection pole (303(1)), wherein the electrochemical energy stores (301(1), 301(2), 301(3)) electrically connected between the electrical connection (308(1)) and a second primary connection pole (302(2))_are electrically connectable to the first secondary connection pole (303(1)) of the electrical energy storage system (300) by means of the first primary switch (307(1)) to provide a secondary voltage, which is lower than the primary voltage, to capture a voltage variable (309) that represents a voltage of the electric power source; and produce a plausibility information (312) on the basis of a comparison (311) of the captured voltage variable (309) with a prescribed voltage range (310).

\* \* \* \* \*